United States Patent
Kajiya

(10) Patent No.: US 10,926,497 B2
(45) Date of Patent: Feb. 23, 2021

(54) METHOD OF FORMING ANTIREFLECTION OPTICAL BODY, AND DISPLAY PANEL

(71) Applicant: Dexerials Corporation, Tokyo (JP)

(72) Inventor: Shunichi Kajiya, Tagajo (JP)

(73) Assignee: Dexerials Corporation, Tokyo (JP)

(*) Notice: Subject to any disclaimer, the term of this patent is extended or adjusted under 35 U.S.C. 154(b) by 239 days.

(21) Appl. No.: 16/062,818

(22) PCT Filed: Dec. 16, 2016

(86) PCT No.: PCT/JP2016/087648
§ 371 (c)(1),
(2) Date: Jun. 15, 2018

(87) PCT Pub. No.: WO2017/104834
PCT Pub. Date: Jun. 22, 2017

(65) Prior Publication Data
US 2019/0160767 A1    May 30, 2019

(30) Foreign Application Priority Data
Dec. 18, 2015   (JP) .............................. JP2015-247857

(51) Int. Cl.
*B29D 11/00* (2006.01)
*B32B 7/06* (2019.01)
(Continued)

(52) U.S. Cl.
CPC ............ *B29D 11/0074* (2013.01); *B32B 7/02* (2013.01); *B32B 7/023* (2019.01); *B32B 7/06* (2013.01);
(Continued)

(58) Field of Classification Search
CPC ......... B29D 11/0074; B32B 7/06; B32B 7/02; B32B 7/023; B32B 9/00; B32B 17/10165;
(Continued)

(56) References Cited

U.S. PATENT DOCUMENTS

| 2009/0120566 A1 | 5/2009 | Okayama et al. |
| 2011/0123777 A1* | 5/2011 | Imaoku ................. G02B 1/118 |
| | | 428/172 |

FOREIGN PATENT DOCUMENTS

| CN | 202013889 U | 10/2011 |
| JP | 2003090902 A | 3/2003 |

(Continued)

OTHER PUBLICATIONS

Mar. 21, 2017, International Search Report issued in the International Patent Application No. PCT/JP2016/087648.

(Continued)

*Primary Examiner* — Mathieu D Vargot
(74) *Attorney, Agent, or Firm* — Kenja IP Law PC

(57) ABSTRACT

A method of forming an antireflection optical body (16a) includes: an application step of applying an adhesive (12) other than an epoxy adhesive onto an adherend (11); a fixing step of pressing a substrate film (15) having a fine structure body (16) at one surface side thereof against the adherend (11) from an opposite surface side to the one surface side to fix the adherend (11) and the fine structure body (16) through the adhesive (12); and a peeling separation step of releasing the pressing of the substrate film (15) and peeling fixed fine structure body (16) that is fixed to the adherend (11) through the adhesive (12) from the substrate film (15) while separating the fixed fine structure body (16) from fine structure body (16) on the substrate film (15) at a location where the fine structure body (16) is fixed to the adherend (11) such that the fixed fine structure body (16) is formed on the adherend (11) as an antireflection optical body (16a).

6 Claims, 7 Drawing Sheets

(51) Int. Cl.
  *C09J 5/00* (2006.01)
  *G02B 1/118* (2015.01)
  *B32B 7/02* (2019.01)
  *B32B 9/00* (2006.01)
  *C09J 201/00* (2006.01)
  *B32B 7/023* (2019.01)
  *B32B 17/10* (2006.01)
  *C09J 133/14* (2006.01)
  *B29K 33/04* (2006.01)

(52) U.S. Cl.
  CPC .......... *B32B 9/00* (2013.01); *B32B 17/10165* (2013.01); *B32B 17/10587* (2013.01); *B32B 17/10743* (2013.01); *C09J 5/00* (2013.01); *C09J 133/14* (2013.01); *C09J 201/00* (2013.01); *G02B 1/118* (2013.01); *B29K 2033/04* (2013.01); *C09J 2433/00* (2013.01)

(58) Field of Classification Search
  CPC .......... B32B 17/10587; B32B 17/10743; C09J 5/00; C09J 201/00; C09J 133/14; G02B 1/118
  See application file for complete search history.

(56) References Cited

FOREIGN PATENT DOCUMENTS

| | | |
|---|---|---|
| JP | 2003098304 A | 4/2003 |
| JP | 2010080670 A | 4/2010 |
| JP | 2012227298 A | 11/2012 |
| JP | 2013134276 A | 7/2013 |
| WO | 2010032610 A1 | 3/2010 |
| WO | 2014163185 A1 | 10/2014 |

OTHER PUBLICATIONS

Jun. 5, 2019, Office Action issued by the China National Intellectual Property Administration in the corresponding Chinese Patent Application No. 201680074464.4.

Jun. 19, 2018, International Preliminary Report on Patentability issued in the International Patent Application No. PCT/JP2016/087648.

Aug. 6, 2019, Notification of Reasons for Refusal issued by the Japan Patent Office in the corresponding Japanese Patent Application No. 2015-247857.

Aug. 14, 2019, The Extended European Search Report issued by the European Patent Office in the corresponding European Patent Application No. 16875808.4.

May 14, 2020, Communication pursuant to Article 94(3) EPC issued by the European Patent Office in the corresponding European Patent Application No. 16875808.4.

Aug. 27, 2020, Office Action issued by the Taiwan Intellectual Property Office in the corresponding Taiwanese Patent Application No. 105141724.

* cited by examiner

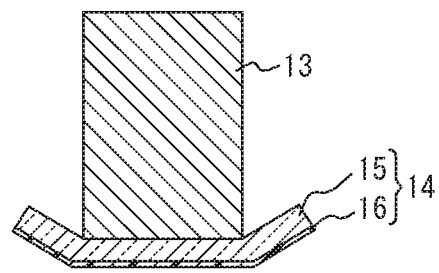
FIG. 1A
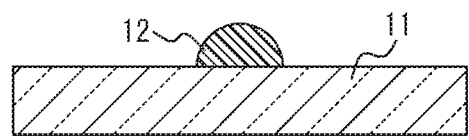
FIG. 1B
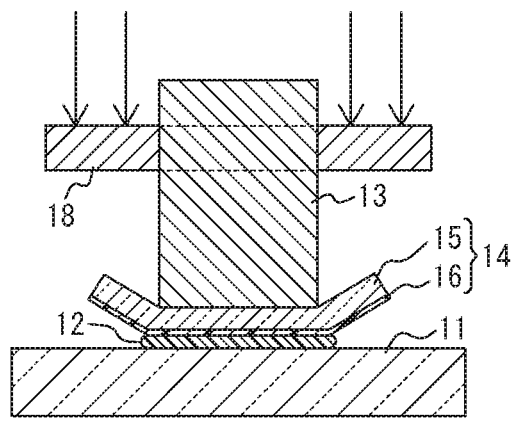
FIG. 1C
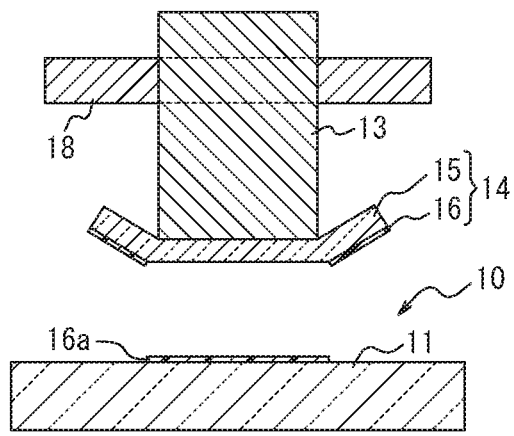

METHOD OF FORMING ANTIREFLECTION OPTICAL BODY, AND DISPLAY PANEL

CROSS-REFERENCE TO RELATED APPLICATION

This application claims priority of Japanese Patent Application No. 2015-247857 filed in Japan on Dec. 18, 2015, the entire disclosure of which is incorporated into this application for reference.

TECHNICAL FIELD

This disclosure relates to a method of forming an antireflection optical body, and a display panel.

BACKGROUND

Many electronic devices such as notebook personal computers (PCs), tablet PCs, smart phones, and mobile telephones include an image sensor (first image sensor) at a surface that is on the opposite side of the device to a surface side at which a display for displaying images is located (display surface side). These electronic devices enable a user to capture an image with the first image sensor while checking the captured image on the display in situations such as when capturing an image of a landscape.

In recent years, electronic devices that also include an image sensor (second image sensor) at the display surface side thereof have become common. These electronic devices improve usability by enabling a user to capture an image with the second image sensor while checking the captured image on the display in situations such as when the user takes a self-portrait.

In the case of an electronic device having an image sensor at the display surface side thereof as described above, a transparent area is provided in a section of the display panel and the image sensor (second image sensor) is located directly below this transparent area. In this configuration, light that is reflected by a lens of the image sensor may also be reflected by the display panel such as to once again be incident on the lens of the image sensor, resulting in the formation of a ghost. In order to inhibit the formation of a ghost, improve transmittance, and so forth, a region of the display panel corresponding to the image sensor (second image sensor) may be subjected to antireflection treatment to form a fine structure body (antireflection optical body) and thereby prevent reflection of light.

In one example of a technique for antireflection treatment (first technique), a film having a fine structure and an adhesive body are attached by a roll-to-roll method, and then the film is attached to an adherend through the adhesive body.

In another example, PTL 1 and PTL 2 disclose a technique (second technique) in which a photocurable resin in a fluid state is applied onto a releasable film having a fine structure, the resin is cured, and then the releasable film is peeled off to form a fine structure body on a base plate formed from the cured resin.

CITATION LIST

Patent Literature

PTL 1: JP 2003-90902 A
PTL 2: JP 2003-98304 A

SUMMARY

Technical Problem

When considering application in electronic devices, there is demand for antireflection treatment to enable thickness-reduction (to a level of 10 μm or less) while also enabling high-efficiency formation of an antireflection optical body.

Since the first technique involves attachment of a film having a fine structure and an adhesive body by a roll-to-roll method, the combined thickness of the film and the adhesive body is required to be at least 50 μm when ease of handling, strength, and so forth are taken into account. Therefore, it is difficult to achieve thickness-reduction in the first technique. Moreover, it is difficult to form an antireflection optical body with high efficiency because attachment of the film, peeling of a release film protecting the adhesive body, and so forth are time consuming.

It is also difficult to form an antireflection optical body with high efficiency by the second technique because curing of a photocurable resin in a fluid state to form a base plate is time consuming.

In light of the problems set forth above, an objective of this disclosure is to provide a method of forming an antireflection optical body that enables high-efficiency formation of an antireflection optical body while also enabling thickness-reduction and to provide a display panel in which an antireflection optical body is formed with high-efficiency while enabling thickness-reduction.

Solution to Problem

In order to solve the problems set forth above, a method of forming an antireflection optical body according to this disclosure comprises: an application step of applying an adhesive other than an epoxy adhesive onto an adherend; a fixing step of pressing a substrate film having a fine structure body at one surface side thereof against the adherend from an opposite surface side to the one surface side to fix the adherend and the fine structure body through the adhesive; and a peeling separation step of releasing the pressing of the substrate film and peeling fixed fine structure body that is fixed to the adherend through the adhesive from the substrate film while separating the fixed fine structure body from fine structure body on the substrate film at a location where the fine structure body is fixed to the adherend such that the fixed fine structure body is formed on the adherend as an antireflection optical body.

In the method of forming an antireflection optical body according to this disclosure, the adhesive is preferably a cyanoacrylate adhesive, a UV curable resin, or a cyanoacrylate UV curable adhesive.

Moreover, in the method of forming an antireflection optical body according to this disclosure, the fine structure body preferably has a recess-protrusion pattern with a pitch that is not more than visible light wavelength.

Furthermore, in the method of forming an antireflection optical body according to this disclosure, it is preferable that a fine recess-protrusion layer having a recess-protrusion pattern is located on the substrate film, an inorganic film is located on the fine recess-protrusion layer, and the fine structure body is located on the inorganic film.

Also, in the method of forming an antireflection optical body according to this disclosure, the fine structure body preferably has a fine structure at one surface at a side corresponding to the substrate film and a fine structure at a surface at an opposite side to the one surface.

Moreover, in the method of forming an antireflection optical body according to this disclosure, the adherend and the fine structure body are preferably fixed in a state in which the adhesive between the fine structure body and the adherend has a thickness of 15 µm or less.

Furthermore, in order to solve the problems set forth above, a display panel according to this disclosure comprises a fine structure body that is formed by any of the methods of forming an antireflection optical body set forth above and that is fixed through an adhesive.

Advantageous Effect

Through the method of forming an antireflection optical body and the display panel according to this disclosure, it is possible to form an antireflection optical body with high-efficiency while enabling thickness-reduction.

BRIEF DESCRIPTION OF THE DRAWINGS

In the accompanying drawings:

FIG. 1A illustrates an application step in a method of forming an antireflection optical body according to an embodiment of this disclosure;

FIG. 1B illustrates a fixing step in a method of forming an antireflection optical body according to an embodiment of this disclosure;

FIG. 1C illustrates a peeling separation step in a method of forming an antireflection optical body according to an embodiment of this disclosure;

DETAILED DESCRIPTION

Figure 2:
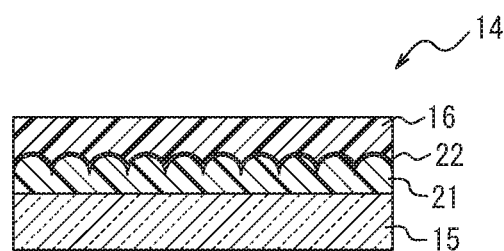
FIG. 2 illustrates an example of configuration of an optical film illustrated in FIGS. 1A to 1C.

The following describes an embodiment of this disclosure with reference to the drawings. However, this disclosure is not limited to just the following embodiment and various alterations may of course be made without deviating from the essence of this disclosure. Note that configurations that are the same are marked with the same reference sign in the drawings and repeated explanation thereof is omitted.

(Method of Forming Antireflection Optical Body)

FIGS. 1A to 1C illustrate a method of forming an antireflection optical body according to an embodiment of this disclosure. The method of forming an antireflection optical body according to the present embodiment includes an application step, a fixing step, and a peeling separation step.

<Application Step>

In an application step illustrated in FIG. 1A, an adhesive 12 other than an epoxy adhesive is applied onto an adherend 11 (glass). The thickness of the adhesive 12 is preferably 15 µm or less, with 5 µm or less being desirable. An optical film 14 is held by a holding member 13. The optical film 14 has a fine structure body 16 at one surface side of a substrate film 15. The optical film 14 is held such that the one surface side at which the fine structure body 16 is located faces toward the adherend 11. The method by which the adhesive 12 is applied onto the adherend 11 is not specifically limited so long as the adhesive 12 can be deposited in accordance with a position at which an antireflection optical body is to be formed. Examples of the adhesive 12 include cyanoacrylate adhesives, UV curable resins (adhesives), and cyanoacrylate UV curable adhesives.

Configuration of the optical film 14 illustrated in FIG. 1A is described in more detail with reference to FIG. 2.

Although no specific limitations are placed on the optical film 14, the optical film 14 may include a substrate film 15, a fine recess-protrusion layer 21, an inorganic film 22, and a fine structure body 16 (thin-film optical body layer) as illustrated in FIG. 2. Note that the fine recess-protrusion layer 21 and the inorganic film 22 are omitted in FIGS. 1A to 1C for simplicity of illustration.

The substrate film 15 can be provided to protect the fine structure body 16 and the like and to improve handleability. Although no specific limitations are placed on the type of substrate film 15, a film that is not easily broken is preferable. For example, a polyethylene terephthalate (PET) film or a triacetyl cellulose (TAC) film may be used. The thickness of the substrate film 15 can be adjusted as appropriate depending on the required handleability of the optical film 14 and may, for example, be 50 µm to 125 µm.

The fine recess-protrusion layer 21 is located on one surface of the substrate film 15. A recess-protrusion pattern (protrusions protruding in thickness direction of optical film 14 and recesses receding in thickness direction of optical film 14) is present at the surface of the fine recess-protrusion layer 21. The protrusions and recesses may be positioned periodically (for example, in a staggered grid or a rectangular grid) or may be positioned randomly. Moreover, the shape of the protrusions and the recesses is not specifically limited and may be bullet-shaped, cone-shaped, column-shaped, needle-shaped, or the like. Note that the shape of the recesses refers to the shape defined by the internal walls of the recesses.

The average period (pitch) of the recess-protrusion pattern at the surface of the fine recess-protrusion layer 21 is not more than visible light wavelength (for example, 830 nm or less), and is preferably at least 100 nm and not more than 350 nm, and more preferably at least 150 nm and not more than 280 nm. Accordingly, the surface of the fine recess-protrusion layer 21 has a structure that is referred to as a "moth-eye structure". Setting the pitch of the recess-protrusion pattern at the surface of the fine recess-protrusion layer 21 as not more than visible light wavelength enables improvement of antireflection properties.

The average period of the recess-protrusion pattern of the fine recess-protrusion layer 21 is an arithmetic mean value of the distances between adjacent protrusions and adjacent recesses. The recess-protrusion pattern of the fine recess-protrusion layer 21 can be observed, for example, using a scanning electron microscope (SEM) or a cross-section transmission electron microscope (cross-section TEM). The method by which the average period is calculated may, for example, be a method in which a plurality of combinations of adjacent protrusions and a plurality of combinations of adjacent recesses are selected, the distances between the protrusions and the distances between the recesses in these combinations are measured, and the measured values are averaged.

Although no specific limitations are placed on the height of the protrusions (depth of the recesses) in the fine recess-protrusion layer 21, the protrusion height is preferably at least 150 nm and not more than 300 nm, more preferably at least 190 nm and not more than 300 nm, and even more preferably at least 190 nm and not more than 230 nm.

The inorganic film 22 is formed from an inorganic material such as tungsten oxide, silicon oxide, silicon, or ITO. The inorganic film 22 is formed on the surface of the fine recess-protrusion layer 21 with a thickness of 5 nm to 50 nm. The inorganic film 22 is provided as a release layer for facilitating peeling of the fine structure body 16.

The fine structure body 16 is a thin-film optical body layer that is located on the inorganic film 22. A recess-protrusion pattern that is the reverse of the recess-protrusion pattern of the fine recess-protrusion layer 21 is located at the surface of the fine structure body 16 at a side corresponding to the inorganic film 22. The surface of the fine structure body 16 at the opposite side thereof relative to the inorganic film 22 is flat.

A method of producing the optical film 14 illustrated in FIG. 2 is described with reference to FIGS. 3A to 3C.

Figure 3A:
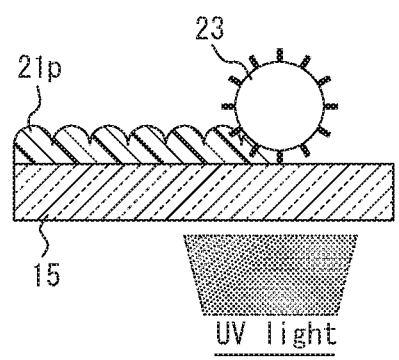
FIG. 3A illustrates an example of a method of producing the optical film illustrated in FIG. 2.

A substrate film 15 is prepared and then a curable resin layer 21p formed, for example, from an uncured UV curable resin (for example, UV curable acrylic resin) is formed on one surface of the substrate film 15 as illustrated in FIG. 3A. However, note that the resin used to form the curable resin layer 21p is not limited to a UV curable acrylic resin.

The curable resin layer 21p is preferably formed from a curable resin composition for which the corresponding cured product is transparent. The curable resin composition may contain, for example, a polymerizable compound and a polymerization initiator. The polymerizable compound is a resin that is cured through the polymerization initiator. Examples of the polymerizable compound include an epoxy polymerizable compound and an acrylic polymerizable compound.

The epoxy polymerizable compound is a monomer, oligomer, or prepolymer that includes one epoxy group or two or more epoxy groups in a molecule thereof. Examples of the epoxy polymerizable compound include various bisphenol-type epoxy resins (for example, bisphenol A-type and bisphenol F-type), novolac-type epoxy resins, various modified epoxy resins such as rubber modified epoxy resins and urethane modified epoxy resins, naphthalene-type epoxy resins, biphenyl-type epoxy resins, phenol novolac-type epoxy resins, stilbene-type epoxy resins, triphenolmethane-type epoxy resins, dicyclopentadiene-type epoxy resins, triphenylmethane-type epoxy resins, and prepolymers thereof.

The acrylic polymerizable compound is a monomer, oligomer, or prepolymer that includes one acrylic group or two or more acrylic groups in a molecule thereof. Such monomers may be further categorized as monofunctional monomers including one acrylic group in a molecule thereof, difunctional monomers including two acrylic groups in a molecule thereof, and polyfunctional monomers including three or more acrylic groups in a molecule thereof.

Examples of "monofunctional monomers including one acrylic group in a molecule thereof" include carboxylic acids (acrylic acid), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), and other functional monomers (2-methoxyethyl acrylate, methoxy ethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropylacrylamide, N,N-dimethylacrylamide, acrylolylmorpholine, N-isopropylacrylamide, N,N-diethylacrylamide, N-vinylpyrrolidone, 2-(perfluorooctyl) ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "difunctional monomers including two acrylic groups in a molecule thereof" include tri(propylene glycol) diacrylate, trimethylolpropane diallyl ether, and urethane acrylate.

Examples of "polyfunctional monomers including three or more acrylic groups in a molecule thereof" include trimethylolpropane triacrylate, dipentaerythritol penta- and hexaacrylate, and di(trimethylolpropane) tetraacrylate.

The polymerizable compound is preferably an acrylic polymerizable compound from a viewpoint of transparency and ease of peeling with the fine structure body 16.

The polymerization initiator is a material that causes curing of the curable resin composition. Examples of the polymerization initiator include thermal polymerization initiators and photopolymerization initiators. The polymerization initiator may alternatively be a material that causes curing through any type of energy rays other than heat and light (for example, an electron beam). The curable resin is a thermosetting resin in a case in which the polymerization initiator is a thermal polymerization initiator and is a photocurable resin in a case in which the polymerization initiator is a photopolymerization initiator.

The polymerization initiator is preferably a photopolymerization initiator and particularly preferably an ultraviolet polymerization initiator from a viewpoint of transparency and ease of peeling with the fine structure body 16. Likewise, the curable resin is preferably an ultraviolet curable acrylic resin. An ultraviolet polymerization initiator is one type of photopolymerization initiator. Examples of the ultraviolet polymerization initiator include 2,2-dimethoxy-1,2- diphenylethan-1-one, 1-hydroxycyclohexyl phenyl ketone, and 2-hydroxy-2-methyl-1-phenylpropan-1-one.

Additives may be added to the curable resin composition used to form the curable resin layer 21p in accordance with the application of the optical film 14. Examples of such additives include inorganic fillers, organic fillers, leveling agents, surface modifiers, and defoamers. Examples of types of inorganic fillers that can be used include metal oxide microparticles of $SiO_2$, $TiO_2$, $ZrO_2$, $SnO_2$, $Al_2O_3$, or the like. Moreover, a release agent or the like may be added to the curable resin composition used to form the curable resin layer 21p in order to facilitate peeling of the fine structure body 16.

The curable resin layer 21p is formed while bringing a roller 23 into close contact with the curable resin layer 21p as illustrated in FIG. 3A.

The roller 23 may, for example, have a hollow or solid cylindrical shape. A recess-protrusion pattern that corresponds to the recess-protrusion pattern in the fine recess-protrusion layer 21 is present at the surface of the roller 23. The roller 23 may alternatively have a flat-plate shape. Description of the method of production of the roller 23 having a configuration such as set forth above is omitted since it is well known by people in the relevant technical field and is not directly related to this disclosure.

Through close contacting of the roller 23 with the curable resin layer 21p formed from the uncured UV curable resin, the recess-protrusion pattern at the surface of the roller 23 is transferred to the surface of the curable resin layer 21p. Although the roller 23 may have a flat-plate shape as previously explained, a hollow or solid cylindrical shape enables the recess-protrusion pattern of the roller 23 to be transferred to the curable resin layer 21p by a roll-to-roll method, and thereby enables higher efficiency transfer.

In accompaniment to transfer of the recess-protrusion pattern of the roller 23 to the curable resin layer 21p, UV light is irradiated from the other surface side of the substrate film 15 as illustrated in FIG. 3A so as to cure the curable resin layer 21p. Through this operation, a fine recess-protrusion layer 21 can be formed on the substrate film 15. The surface of the roller 23 may be subjected to release treatment using a fluorine material or the like to facilitate peeling of the fine recess-protrusion layer 21 from the roller 23.

Figure 3B:
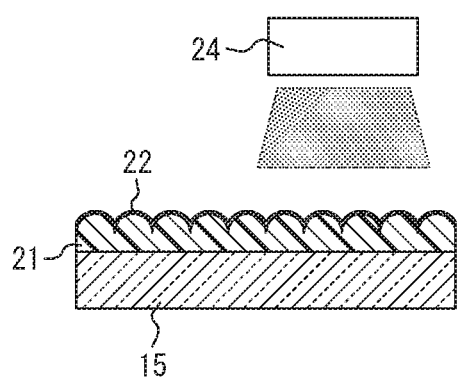
FIG. 3B illustrates an example of a method of producing the optical film illustrated in FIG. 2.

After formation of the fine recess-protrusion layer 21, an inorganic film 22 of approximately 5 nm to 50 nm in thickness is formed on the surface of the fine recess-protrusion layer 21 as a release layer by sputtering, as illustrated in FIG. 3B, using a sputtering target 24 made from tungsten oxide, for example. The material of the inorganic film 22 may alternatively be silicon oxide, silicon, ITO, or the like.

Figure 3C:
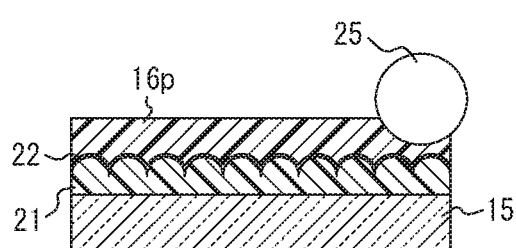
FIG. 3C illustrates an example of a method of producing the optical film illustrated in FIG. 2.

After formation of the inorganic film 22, a UV curable resin layer 16p formed from an uncured UV curable resin (for example, UV curable acrylic resin) is formed on the inorganic film 22 as illustrated in FIG. 3C. Since the UV curable resin layer 16p is formed from an uncured UV curable resin composition, the UV curable resin also enters into recesses of a recess-protrusion pattern of the inorganic film 22 such that a recess-protrusion structure is formed at the surface of the UV curable resin layer 16p at a side thereof corresponding to the inorganic film 22. In other words, a recess-protrusion pattern that is the reverse of the recess-protrusion pattern at the surface of the fine recess-protrusion layer 21 is formed at the surface of the UV curable resin layer 16p at the side thereof corresponding to the inorganic film 22. Note that the UV curable resin layer 16p may be formed from the same type of composition as the curable resin layer 21p, for example.

Next, a roller 25 is brought into close contact with the UV curable resin layer 16p as illustrated in FIG. 3C. The roller 25 has a flat surface. This causes the surface of the UV curable resin layer 16p at the opposite side thereof relative to the inorganic film 22 to become a flat surface. By irradiating the UV curable resin layer 16p with UV light in accompaniment to close contacting of the roller 25 with the UV curable resin layer 16p, it is possible to cure the UV curable resin layer 16p and form a fine structure body 16 (thin-film optical body layer).

Figure 4:
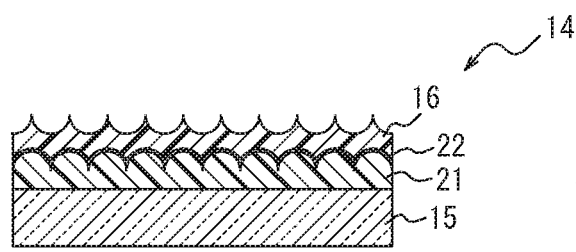
FIG. 4 illustrates another example of configuration of the optical film illustrated in FIGS. 1A to 1C.

Although the above describes an example in FIG. 2 and FIGS. 3A to 3C in which the surface of the fine structure body 16 at the opposite side thereof relative to the inorganic film 22 is a flat surface, the optical film 14 may also have a recess-protrusion pattern at the surface of the fine structure body 16 at the opposite side thereof relative to the inorganic film 22 as illustrated in FIG. 4. In other words, recess-protrusion patterns (fine structures) may be present at both surfaces of the fine structure body 16.

A method of producing the optical film 14 illustrated in FIG. 4 is described with reference to FIGS. 5A to 5C. Note that configurations that are the same as in FIGS. 3A to 3C are marked with the same reference signs in FIGS. 5A to 5C and description thereof is omitted.

Figure 5A:
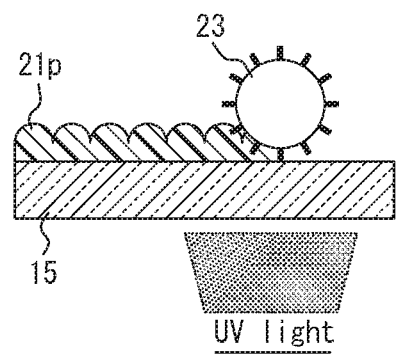
FIG. 5A illustrates an example of a method of producing the optical film illustrated in FIG. 4.
Figure 5B:
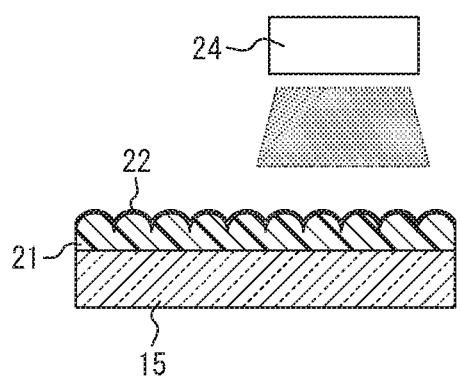
FIG. 5B illustrates an example of a method of producing the optical film illustrated in FIG. 4.

The steps illustrated in FIGS. 5A and 5B are the same as the steps illustrated in FIGS. 3A and 3B. In other words, in the step illustrated in FIG. 5A, a curable resin layer 21p is formed on one surface of a substrate film 15 and a roller 23 is brought into close contact with the curable resin layer 21p to form a recess-protrusion pattern at the surface of the curable resin layer 21p. The curable resin layer 21p is also irradiated with UV light to cure the curable resin layer 21p and form a fine recess-protrusion layer 21. In the step illustrated in FIG. 5B, an inorganic film 22 is formed on the fine recess-protrusion layer 21.

Figure 5C:
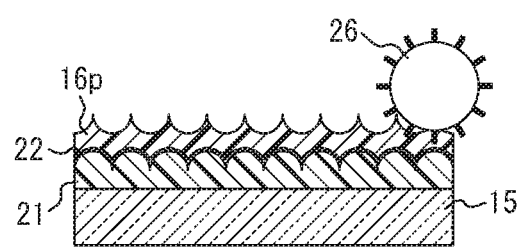
FIG. 5C illustrates an example of a method of producing the optical film illustrated in FIG. 4.

In the step illustrated in FIG. 5C, a UV curable resin layer 16p is formed on the inorganic film 22 in the same manner as in the step illustrated in FIG. 3C. Next, a roller 26 is brought into close contact with the UV curable resin layer 16p as illustrated in FIG. 5C. A recess-protrusion pattern is present at the surface of the roller 26. This causes a recess-protrusion pattern to also be formed at the surface of the UV curable resin layer 16p at the opposite side thereof relative to the inorganic film 22. The roller 26 may be the same as the roller 23. By irradiating the UV curable resin layer 16p with UV light in accompaniment to close contacting of the roller 26 with the UV curable resin layer 16p, it is possible to cure the UV curable resin layer 16p and form a fine structure body 16 (thin-film optical body layer) having recess-protrusion patterns at both surfaces thereof.

<Fixing Step>

The following description once again refers to FIGS. 1A to 1C. In a fixing step illustrated in FIG. 1B that is performed after the application step illustrated in FIG. 1A, the holding member 13 is secured using a clamp jig 18, and the optical film 14 is pressed against the adhesive 12 applied onto the adherend 11 for a specific time by the holding member 13, via the clamp jig 18, from the surface at the opposite side to the surface at which the fine structure body 16 is located. The adhesive 12 is pressed by the optical film 14 such as to spread out between the adherend 11 and the optical film 14 and undergo curing. This curing of the adhesive 12 fixes the fine structure body 16 and the adherend 11.

<Peeling Separation Step>

In a peeling separation step illustrated in FIG. 1C, the pressing of the optical film 14 is released and the optical film 14 is detached from the adherend 11 to thereby peel off the fine structure body 16. Through the fixing step, the fine structure body 16 (thin-film optical body layer) of the optical film 14 and the adherend 11 are fixed by the cured adhesive 12 in a region of the fine structure body 16 at which the adhesive 12 is present. By detaching the optical film 14, fixed fine structure body 16 that is fixed to the adherend 11 is peeled with the interface between the fine structure body 16 and the inorganic film 22 as a boundary while separating (severing) the fixed fine structure body 16 from fine structure body 16 on the substrate film 15 at a location where the fine structure body 16 is fixed to the adherend 11. As a result, the fine structure body 16 that is fixed to the adherend 11 and is separated from the fine structure body on the substrate film 15 is formed on the adherend 11 as an antireflection optical body 16a. Note that in FIG. 1C, the cured adhesive 12 that fixes the fine structure body 16 and the adherend 11 is omitted.

The fine structure body 16 can be peeled such as to become fixed to the adherend 11 as the antireflection optical body 16a by providing adhesive force between the adherend 11 and the fine structure body 16 through the adhesive 12 that is stronger than adhesive force between the fine structure body 16 and the fine recess-protrusion layer 21. Moreover, the formation of the inorganic film 22 as a release layer between the fine structure body 16 and the fine recess-protrusion layer 21 can facilitate peeling of the fine structure body 16.

(Display Panel)

Figure 6:
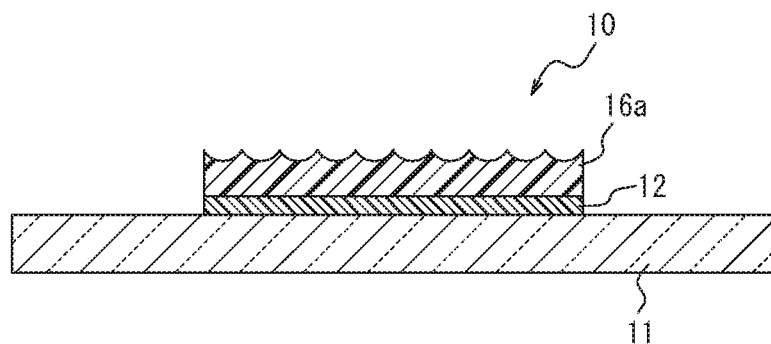
FIG. 6 illustrates an example of a state in which an antireflection optical body has been formed on an adherend by a formation method according to an embodiment of this disclosure.
Figure 7:
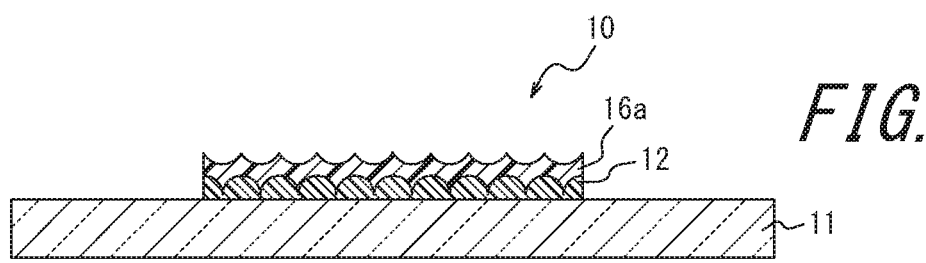
FIG. 7 illustrates another example of a state in which an antireflection optical body has been formed on an adherend by a formation method according to an embodiment of this disclosure.

FIGS. 6 and 7 illustrate examples of a state in which an antireflection optical body 16a has been formed on an adherend 11 by the formation method according to the present embodiment. FIG. 6 illustrates an example in which the optical film 14 illustrated in FIG. 2 (optical film 14 in which the surface of the fine structure body 16 at the opposite side thereof relative to the inorganic film 22 is flat) is used. FIG. 7 illustrates an example in which the optical film 14 illustrated in FIG. 4 (optical film 14 in which recess-protrusion patterns are present at both surfaces of the fine structure body 16) is used.

As illustrated in FIGS. 6 and 7, through the present embodiment, it is possible to form a component 10 that includes an antireflection optical body 16a formed on an adherend 11 via a cured adhesive 12. The component 10 may be used, for example, for a display panel or the like.

Note that in a case in which an optical film 14 that has recess-protrusion patterns at both surfaces of the fine structure body 16 is used, the adhesive 12 enters into and is cured in recesses in the surface of the antireflection optical body 16a at a side corresponding to the adherend 11 as illustrated in FIG. 7. This enables improvement of adhesive force between the antireflection optical body 16a and the adherend 11.

In the present embodiment, the adherend 11 and the fine structure body 16 are fixed using the adhesive 12. In general, an adhesive 12 other than an epoxy adhesive has a property of curing in a short time compared to an epoxy adhesive. Consequently, only a short time is required for press-fixing of the optical film 14 and the adherend 11 in the fixing step, which enables high-efficiency formation (i.e., formation in a short time) of the antireflection optical body 16a. Moreover, since only a small amount of the adhesive 12 is applied onto the adherend 11 in the present embodiment, the volume for which reaction is required is reduced, and the adherend 11 and the fine structure body 16 can be fixed through curing of the adhesive 12 for a short curing time. Moreover, this configuration enables thickness-reduction compared to a configuration in which adhesive tape is used.

EXAMPLES

The following provides a more specific description of this disclosure through examples and comparative examples. However, this disclosure is not limited by the following examples.

Example 1

An optical film 14 having the configuration illustrated in FIG. 2 was used in the present example. First, production conditions for the optical film 14 are described.

A PET film of 125 µm in thickness produced by Teijin Limited was used as a substrate film 15. A curable resin layer 21p formed from a UV curable resin (produced by Dexerials Corporation; product name: SK1120) was formed on the substrate film 15. A roller 23 was brought into close contact with the curable resin layer 21p and irradiation with UV light was performed to cure the curable resin layer 21p and form a fine recess-protrusion layer 21. A recess-protrusion pattern having a recess-protrusion pitch of 150 nm to 230 nm and a recess depth of approximately 250 nm was formed in the fine recess-protrusion layer 21. An inorganic film 22 of 20 nm in thickness was formed as a release layer on the surface of the fine recess-protrusion layer 21 by sputtering using a sputtering target made from tungsten oxide. The thickness of the inorganic film 22 is preferably 5 nm to 50 nm, and more preferably 15 nm to 35 nm. This is because the peeling effect achieved through the inorganic film 22 is reduced in both a case in which the inorganic film 22 is too thin and in a case in which the inorganic film 22 is too thick.

A UV curable resin layer 16p of approximately 2 µm in thickness that was formed from an uncured UV curable acrylic resin (produced by Dexerials Corporation; product name: SK1120) was formed on the inorganic film 22. A roller 25 having a flat surface was brought into close contact with the UV curable resin layer 16p, and the UV curable resin layer 16p was irradiated with UV light with a dose of 10 kJ/m$^2$ to cure the UV curable resin layer 16p and form a fine structure body 16 of approximately 2 µm in thickness. A recess-protrusion pattern that corresponded to the recess-protrusion pattern formed in the fine recess-protrusion layer 21 and that had a recess-protrusion pitch of 150 nm to 230 nm and a recess depth of approximately 250 nm was formed at the surface of the fine structure body 16 at a side thereof corresponding to the inorganic film 22. After formation of the fine structure body 16, the produced optical film 14 was left exposed to the atmosphere.

In the present example, a cyanoacrylate adhesive was used as the adhesive 12. The cyanoacrylate adhesive was applied onto one surface of an adherend 11 made from glass as illustrated in FIG. 1A.

Next, the optical film 14 was pressed against the applied adhesive 12 (cyanoacrylate adhesive) on the adherend 11 for a specific time by a holding member 13, via a clamp jig 18, from a surface at the opposite side to the one surface at which the fine structure body 16 was formed, and the adherend 11 and the fine structure body 16 were fixed through the cyanoacrylate adhesive as illustrated in FIG. 1B. Note that fixing of the fine structure body 16 of the optical film 14 and the adherend 11 through the adhesive in Example 1 was carried out in the atmosphere (i.e., in a state in which the adhesion surfaces of the fine structure body 16 and the adherend 11 were coated with moisture (moisture in the atmosphere)).

Next, the pressing of the optical film 14 was released and the optical film 14 was detached from the adherend 11 to perform peeling separation of the fine structure body 16 fixed to the adherend 11 through the cyanoacrylate adhesive as illustrated in FIG. 1C.

Example 2

An optical film 14 having recess-protrusion patterns at both surfaces of a fine structure body 16 as illustrated in FIG. 4 was used in the present example. The production conditions for the optical film 14 in the present example were the same as in Example 1 with the exception that a roller 26 having a recess-protrusion pattern at the surface was brought into close contact as illustrated in FIG. 5C after formation of a UV curable resin layer 16$p$ and the thickness of the fine structure body 16 was 3 μm.

Moreover, the optical film 14 having recess-protrusion patterns at both surfaces of the fine structure body 16 was used to form an antireflection optical body 16$a$ on an adherend 11 under the same conditions as in Example 1.

As previously explained with reference to FIG. 7, in a case in which an optical film 14 having recess-protrusion patterns at both surfaces of a fine structure body 16 is used, a cyanoacrylate adhesive enters into and is cured in recesses of the fine structure body 16, which improves adhesive force between the fine structure body 16 and an adherend 11.

The antireflection optical body formed in Example 1 gave a result of 50/100 to 90/100 in a cross-cut test, whereas the antireflection optical body 16$a$ formed in Example 2 gave a result of 100/100 in a cross-cut test. These results demonstrate that adhesive force between a fine structure body 16 and an adherend 11 can be improved by providing recess-protrusion patterns at both surfaces of the fine structure body 16.

The inventor of the present application attempted to fix a fine structure body 16 and an adherend 11 through a cyanoacrylate adhesive in a state in which the adhesion surfaces of the fine structure body 16 and the adherend 11 were not coated with moisture. Specifically, the inventor attempted to fix a fine structure body 16 of an optical film 14 and an adherend 11 through a cyanoacrylate adhesive after performing oxygen ashing treatment to remove moisture from the surface of the fine structure body 16 and the surface of the adherend 11. However, curing of the cyanoacrylate adhesive did not occur in this situation and it was not possible to fix the fine structure body 16 and the adherend 11.

This result demonstrates that if the adhesion surfaces for a cyanoacrylate adhesive (surfaces of fine structure body 16 and adherend 11) are not coated with moisture, a polymerization reaction does not occur, and the cyanoacrylate adhesive is not cured. Consequently, the fine structure body 16 cannot be fixed to the adherend 11. In consideration of the result that, in the atmosphere, cyanoacrylate adhesive curing occurred and the fine structure body 16 and the adherend 11 were fixed, coating of the adhesion surfaces for the cyanoacrylate adhesive with moisture to the extent present in the atmosphere is appropriate.

In fixing of the fine structure body 16 and the adherend 11 through the cyanoacrylate adhesive in Example 1, the thickness of the formed body (cyanoacrylate adhesive and fine structure body 16) on the adherend 11 was measured to be 8.6 μm, 7.75 μm, and 5.5 μm for three prepared samples. Note that the thickness of the formed body was measured by a film thickness meter (product name: LITEMATIC VL-505) produced by Mitutoyo Corporation with a measurement condition of 0.15 N. The thickness is a value obtained by subtracting a measured value prior to formation of the formed body from a measured value after formation of the formed body.

The inventor of the present application attempted to fix a fine structure body 16 and an adherend 11 through a cyanoacrylate adhesive with a applied amount of the cyanoacrylate adhesive that was increased (i.e., film thickness (adhesion thickness) of the cyanoacrylate adhesive was increased) relative to a case in which a fine structure body 16 and an adherend 11 were fixed through the cyanoacrylate adhesive. However, when the applied amount of the cyanoacrylate adhesive was increased, cyanoacrylate adhesive curing did not occur even in the fixing step illustrated in FIG. 1B. The thickness of a formed body in a case in which cyanoacrylate adhesive curing did not occur was measured to be 17.8 μm, 25 μm, and 25 μm for three prepared samples. Note that the thickness of the formed body including the cyanoacrylate adhesive and the fine structure body 16 was measured because precise control of the applied amount of the cyanoacrylate adhesive is difficult.

This result demonstrates that curing of the adhesive 12 does not occur if an excessive amount of the adhesive 12 is present relative to the amount of moisture. Based on the thickness measurement results described above and taking into account that the thickness of the fine structure body 16 in Example 1 was 2 μm, it is preferable that the applied amount (adhesion thickness) of the adhesive 12 is 15 μm or less, with 5 μm or less being desirable as previously described.

Comparative Example 1

The following describes a method of forming an antireflection optical body on an adherend according to Comparative Example 1.

First, the configuration of an optical film 30 used in Comparative Example 1 is described with reference to FIG. 8.

Figure 8:
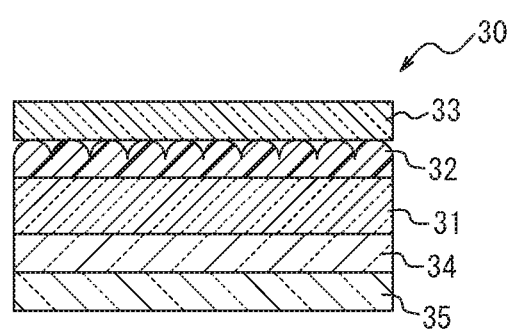
FIG. 8 illustrates configuration of an optical film according to Comparative Example 1.

The optical film 30 illustrated in FIG. 8 includes a substrate film 31, a fine recess-protrusion layer 32, a protector film 33, an adhesive film 34, and a release film 35.

The substrate film 31 was a PET film of 50 μm in thickness. The fine recess-protrusion layer 32 was formed on one surface of the substrate film 31 with a thickness of 3 μm. A recess-protrusion pattern having a recess-protrusion pitch of 150 nm to 230 nm and a recess depth of approximately 250 nm was formed at the surface of the fine recess-protrusion layer 32. The protector film 33 was provided such as to cover the surface at which the recess-protrusion pattern of the fine recess-protrusion layer 32 was formed in order to protect the recess-protrusion pattern of the fine recess-protrusion layer 32.

The adhesive film 34 (double-sided tape) of 25 μm in thickness was attached to the other surface of the substrate film 31 (surface at the opposite side to the surface at which the fine recess-protrusion layer 32 was formed). The release film 35 was provided at the surface at the opposite side of the adhesive film 34 to the surface that was attached to the substrate film 31 in order to protect an adhesive part of the adhesive film 34.

The optical film 30 was punched out as a specific size and was subsequently attached to an adherend 11. The attachment to the adherend 11 was performed by peeling off the release film 35 and then attaching an adhesive surface of the adhesive film 34 at a side thereof corresponding to the release film 35 with the adherend. Thereafter, a roller was used to perform air removal and then the protector film 33 was peeled off.

Figure 9:
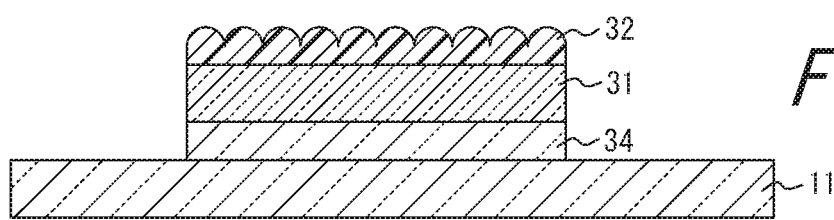
FIG. 9 illustrates a state in which an antireflection optical body has been formed on an adherend by a formation method according to Comparative Example 1.

FIG. 9 illustrates a state in which an antireflection optical body has been formed on an adherend 11 by the formation method according to Comparative Example 1.

As illustrated in FIG. 9, the substrate film 31 having the fine recess-protrusion layer 32 formed on one surface thereof was adhered to the adherend 11 at the other surface thereof via the adhesive film 34. As a result, the fine recess-protrusion layer 32 was formed on the adherend 11 as an antireflection optical body.

Comparative Example 2

The following describes a method of forming an antireflection optical body on an adherend according to Comparative Example 2.

Figure 10:
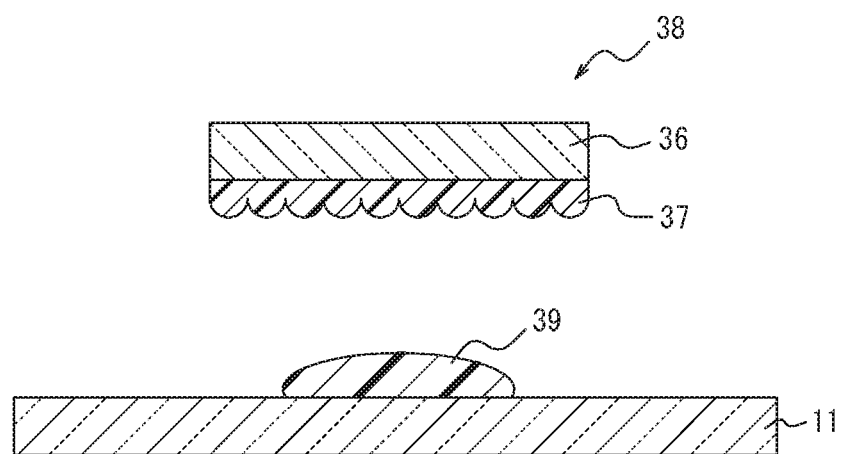
FIG. 10 illustrates a method of forming an antireflection optical body according to Comparative Example 2.

In Comparative Example 2, a film mold 38 was prepared in which a fine recess-protrusion layer 37 formed from a cured UV curable resin was formed on one surface of a substrate film 36 (PET film of 125 μm in thickness produced by Teijin Limited) as illustrated in FIG. 10. A recess-protrusion pattern having a recess-protrusion pitch of 150 nm to 230 nm and a recess depth of approximately 250 nm was formed at the surface of the fine recess-protrusion layer 37. The surface of the fine recess-protrusion layer 37 was subjected to release treatment using a fluorine material.

Next, a UV curable resin 39 (glass adhesion material produced by ThreeBond Holdings Co., Ltd.) was applied onto an adherend 11, and the fine recess-protrusion layer 37 of the film mold 38 was brought into close contact with the UV curable resin 39. Thereafter, the UV curable resin 39 was irradiated with UV light with a dose of 30 kJ/m$^2$ to cure the UV curable resin 39.

Figure 11:
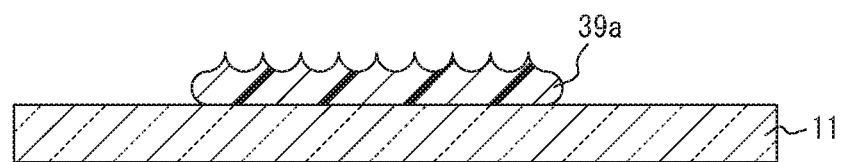
FIG. 11 illustrates a state in which an antireflection optical body has been formed on an adherend by the formation method according to Comparative Example 2.

Through the close contacting of the fine recess-protrusion layer 37 with the UV curable resin 39, a recess-protrusion pattern that was the reverse of the recess-protrusion pattern formed in the fine recess-protrusion layer 37 was formed in the UV curable resin 39. Moreover, through curing of the UV curable resin 39, an antireflection optical body 39a formed from the cured UV curable resin 39 was formed on the adherend 11 as illustrated in FIG. 11.

As previously described, the thickness of the formed body (combined thickness of antireflection optical body 16a and cured cyanoacrylate adhesive) on the adherend 11 in Example 1 was restricted to 10 μm or less (8.6 μm, 7.75 μm, and 5.5 μm), which enabled thickness-reduction. Since the thickness of the fine structure body 16 only differs by 1 μm between Examples 1 and 2, there is not thought to be a significant difference in the thickness of the formed body, and thus Example 2 also enables thickness-reduction.

On the other hand, the formed body in Comparative Example 1 had a thickness of tens of micrometers as a result of the adhesive film 34, the substrate film 31, and the fine recess-protrusion layer 32 being stacked on the adherend 11. Therefore, it is difficult to achieve thickness-reduction in the formation method of Comparative Example 1.

The following compares the time required for formation of an antireflection optical body on an adherend 11.

In Examples 1 and 2, the time required for applying the cyanoacrylate adhesive onto the adherend 11, clamping the optical film 14 against the cyanoacrylate adhesive, and detaching the optical film 14 to form the antireflection optical body 16a was approximately 7 seconds.

On the other hand, the time required for peeling off the release film 35, attaching the optical film 30 to the adherend 11, performing air removal using a roller, and peeling off the protector film 33 in Comparative Example 1 was approximately 23 seconds. Peeling of the release film 35 and the protector film 33 and attachment of the optical film 30 to the adherend 11 in Comparative Example 1 were time consuming, and thus formation of the antireflection optical body in Comparative Example 1 required more time than in Examples 1 and 2.

In Comparative Example 2, application of the UV curable resin 39 onto the adherend 11, close contact holding of the film mold 38 against the UV curable resin 39, curing of the UV curable resin 39 through irradiation with UV light, and detachment of the film mold 38 required approximately 35 seconds. Curing of the UV curable resin 39 in Comparative Example 2 was time consuming, and thus formation of the antireflection optical body in Comparative Example 2 required more time than in Examples 1 and 2.

Although the steps by which an antireflection optical body is formed in Examples 1 and 2 and Comparative Example 2 are similar, Examples 1 and 2 make use of a cyanoacrylate adhesive having a shorter curing time than a UV curable resin, which can shorten the time required for formation of the antireflection optical body and enable high-efficiency formation of the antireflection optical body.

The inventor of this application paid attention to the fact that a cyanoacrylate adhesive has a property of short curing time compared to a UV curable resin and attempted to form an antireflection optical body by using a cyanoacrylate adhesive in place of the UV curable resin 39 in Comparative Example 2. However, in this method, the fine recess-protrusion layer 37 of the film mold 38 and the adherend 11 became fixed through the cyanoacrylate adhesive even when the surface of the fine recess-protrusion layer 37 was subjected to release treatment. Moreover, when the fine recess-protrusion layer 37 was forcefully peeled off, damage occurred to material in-between layers and it was not possible to favorably form an antireflection optical body.

Next, evaluation results for antireflection properties of the antireflection optical bodies 16a formed in Examples 1 and 2 are described.

Figure 12A:
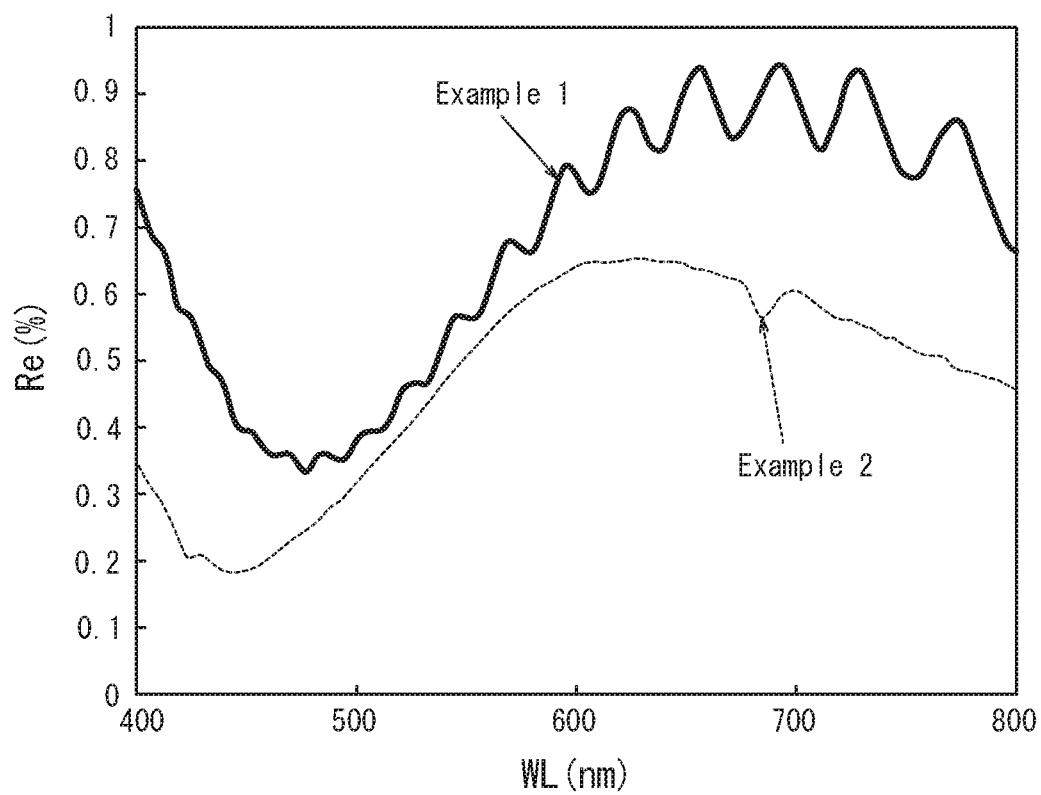
FIG. 12A is a graph illustrating reflection spectra of antireflection optical bodies formed by formation methods according to Examples 1 and 2.
Figure 12B:
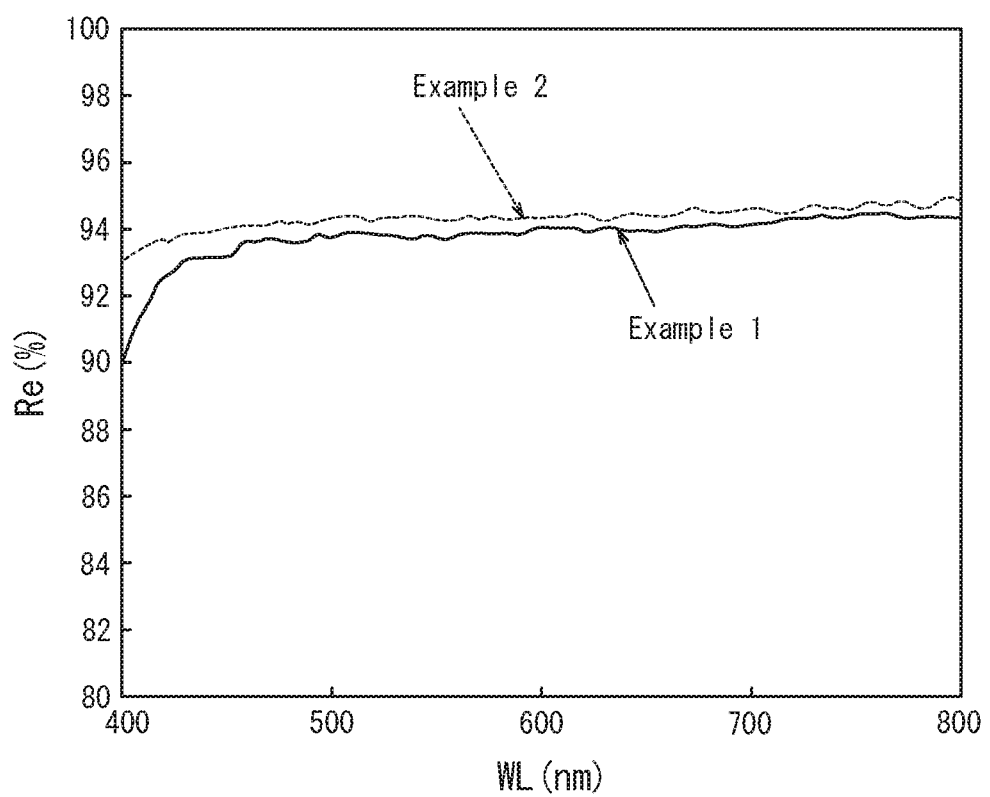
FIG. 12B is a graph illustrating transmission spectra of antireflection optical bodies formed by formation methods according to Examples 1 and 2.

The luminous reflectance (Y value reflectance in XYZ color system; reflectance measured in accordance with JIS Z 8722) of the antireflection optical bodies 16a formed in Examples 1 and 2 is shown in Table 1. Luminous reflectance is typically 1% or less, and preferably 0.6% or less for use as an antireflection component. FIG. 12A illustrates reflection spectra for the antireflection optical bodies 16a formed in Examples 1 and 2, and FIG. 12B illustrates transmission spectra for antireflection components formed in Examples 1 and 2. Note that in FIG. 12A, the horizontal axis represents the wavelength of incident light and the vertical axis represents the reflectance of incident light. Moreover, in FIG. 12B, the horizontal axis represents the wavelength of incident light and the vertical axis represents the transmittance of incident light.

TABLE 1

| | Luminous reflectance |
|---|---|
| Example 1 | 0.59 |
| Example 2 | 0.50 |

The luminous reflectance was 0.6% or less in both Example 1 and Example 2 as shown in Table 1. FIG. 12A indicates that good reflection properties are achieved in both Example 1 and Example 2 with a reflectance of 1.0% or less being obtained with respect to light of each wavelength. Moreover, FIG. 12B indicates that good transmission properties are achieved in both Example 1 and Example 2 with a high transmittance of 90% or more being obtained with respect to light of each wavelength.

The reflection spectrum for Example 1 exhibited rippling across the entire wavelength band as illustrated in FIG. 12A. In contrast, this rippling did not occur for Example 2 in which an antireflection optical body was formed under the same conditions with the exception of the structure of the optical film 14 (fine structure body 16). This indicates that the rippling in Example 1 is due to the configuration of the fine structure body 16.

In Example 1, the interface of the adherend 11 and the adhesive 12 and the interface of the adhesive 12 and the fine structure body 16 are both roughly flat. Consequently, light reflected at the interface of the adherend 11 and the adhesive 12 and light reflected at the interface of the adhesive 12 and the fine structure body 16 may undergo interference due to the difference in the refractive index of light at the interface of the adherend 11 and the adhesive 12 and the refractive index of light at the interface of the adhesive 12 and the fine structure body 16.

In Example 2, on the other hand, the interface of the adherend 11 and the adhesive 12 is flat but the interface of the adhesive 12 and the fine structure body 16 has a recess-protrusion structure. Consequently, interference of light reflected at the two interfaces does not occur, which is thought to suppress the rippling. Accordingly, the provision of recess-protrusion patterns at both surfaces of the fine structure body 16 as in Example 2 can suppress rippling in a reflection spectrum and enable the achievement of better reflection properties.

As set forth above, a method of producing an antireflection optical body 16a according to an embodiment of this disclosure includes: an application step of applying an adhesive 12 other than an epoxy adhesive onto an adherend 11; a fixing step of pressing a substrate film 15 having a fine structure body 16 at one surface side thereof against the adherend 11 from an opposite surface side to the one surface side to fix the adherend 11 and the fine structure body 16 through the adhesive 12; and a peeling separation step of releasing the pressing of the substrate film 15 and peeling fixed fine structure body 16 that is fixed to the adherend 11 through the adhesive 12 from the substrate film 15 while separating the fixed fine structure body 16 from fine structure body 16 on the substrate film 15 at a location where the fine structure body 16 is fixed to the adherend 11 such that the fixed fine structure body 16 is formed on the adherend 11 as an antireflection optical body 16a.

In the fixing step, the adherend 11 and the fine structure body 16 are fixed through the adhesive 12 other than an epoxy adhesive. As a result of the adhesive 12 other than an epoxy adhesive having a property of curing in a short time compared to an epoxy adhesive, the adherend 11 and the fine structure body 16 can be fixed in a short time. Moreover, since only a small amount of the adhesive 12 needs to be applied, the volume for which reaction is required can be reduced and the adhesive 12 can be cured in a short curing time to fix the adherend 11 and the fine structure body 16. This enables high-efficiency formation of the antireflection optical body 16a. Moreover, thickness-reduction can be achieved because it is not necessary to fix the adherend 11 and the fine structure body 16 via an adhesive film.

It should be noted that although this disclosure has been described based on the drawings and embodiment, a person in the relevant technical field could easily make various modifications and revisions based on the contents of this disclosure. Therefore, such modifications and revisions are also included within the scope of this disclosure.

REFERENCE SIGNS LIST 10 component
11 adherend
12 adhesive
13 holding member
14 optical film
15 substrate film
16 fine structure body
16a antireflection optical body
16p UV curable resin layer
18 clamp jig
21 fine recess-protrusion layer
21p UV curable resin layer
22 inorganic film
23, 25, 26, 28 roller
24 sputtering target
30 optical film
31, 36 substrate film
32, 37 fine recess-protrusion layer
33 protector film
34 adhesive film
35 release film
38 film mold
39 curable resin
39a antireflection optical body

The invention claimed is:

1. A method of forming an antireflection optical body on an adherend, comprising:
an application step of applying an adhesive other than an epoxy adhesive onto the adherend;
a fixing step of pressing a substrate film having a fine structure body at one surface side thereof against the adherend from an opposite surface side to the one surface side to fix the adherend and the fine structure body through the adhesive to create a fixed fine structure body; and
a peeling separation step of releasing the pressing of the substrate film and peeling the fixed fine structure body that is fixed to the adherend through the adhesive from the substrate film while separating the fixed fine structure body from the fine structure body on the substrate film at a location where the fine structure body is fixed to the adherend such that the fixed fine structure body is formed on the adherend as an antireflection optical body.

2. The method of forming an antireflection optical body according to claim 1, wherein
the adhesive is a cyanoacrylate adhesive, a UV curable resin, or a cyanoacrylate UV curable adhesive.

3. The method of forming an antireflection optical body according to claim 1, wherein
the fine structure body has a recess-protrusion pattern with a pitch that is not more than visible light wavelength.

4. The method of forming an antireflection optical body according to claim 1, wherein
a fine recess-protrusion layer having a recess-protrusion pattern that is reverse of the recess-protrusion pattern of the fine structure body is located on the substrate film, an inorganic film is located on the fine recess-protrusion layer, and the fine structure body is located on the inorganic film.

5. The method of forming an antireflection optical body according to claim 1, wherein the fine structure body has a fine structure at one surface at a side corresponding to the substrate film and a fine structure at a surface at an opposite side to the one surface.

6. The method of forming an antireflection optical body according to claim 1, wherein the adherend and the fine structure body are fixed in a state in which the adhesive between the fine structure body and the adherend has a thickness of 15 µm or less.

* * * * *